Figure 1:
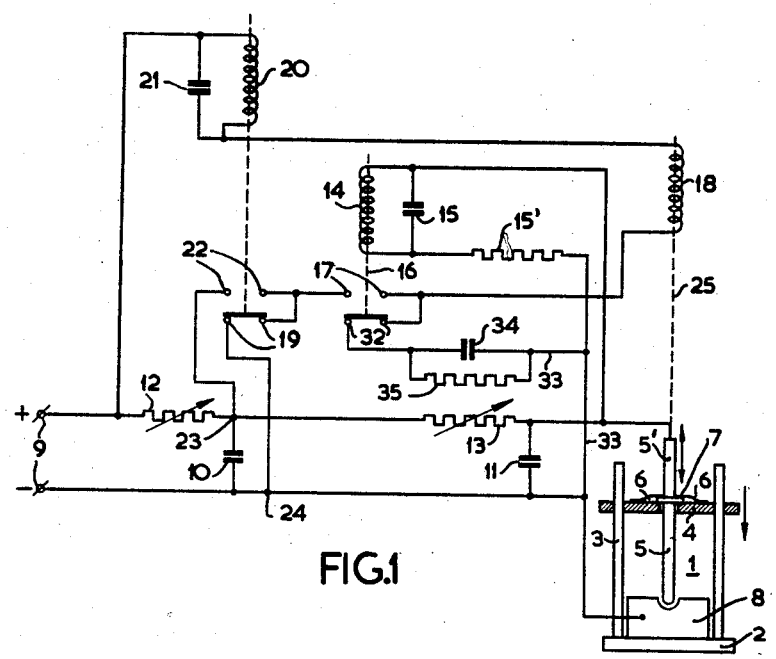

Jan. 3, 1961  H. E. DE BRUIJN  2,967,226
DEVICE FOR PROCESSING METALS
Filed Jan. 12, 1959

INVENTOR
HENDRIK ELIAS DE BRUIJN
BY
AGENT

United States Patent Office 2,967,226
Patented Jan. 3, 1961

2,967,226
DEVICE FOR PROCESSING METALS

Hendrik Elias de Bruijn, Eindhoven, Netherlands, assignor to North American Philips Company, Inc., New York, N.Y., a corporation of Delaware Filed Jan. 12, 1959, Ser. No. 786,300
Claims priority, application Netherlands Feb. 27, 1958
10 Claims. (Cl. 219—69)

The present invention relates to a device for processing metals. More particularly, the invention relates to a device for processing metals with the aid of an electric voltage applied between a work-piece and an electrode which is driven periodically by means of an electromagnetic device. The holder for the electrode is resiliently suspended in a guide member arranged to be slidable with friction on a support. Said holder is provided with a collar or cam such that, as a function of the depth of penetration of the electrode into the work-piece, the cam during the periodic movement of the electrode towards the work-piece can impact with the guide member which is thus displaced, together with the electromagnetic device for driving the electrode, over a small distance along the support towards the work-piece.

In a device of this kind, which is simpler than a device in which the electrode is driven by a servo-motor, the electromagnetic device is powered at a low frequency, for example the mains frequency. Thus, at a frequency of 50 cycles per second the electrode approaches the work-piece a hundred times and also a hundred discharges per second occur between the electrode and the work-piece. If the energy supplied during each discharge is limited on account of the nature of the surface and for obtaining higher accuracy, the speed of chipping decreases considerably, since in this system it is not possible to raise the frequency for compensation.

The present invention mitigates this disadvantage in that the electromagnetic device which is fed by voltage pulses having a frequency considerably lower than the discharge frequency, after each pulse and hence after each impact, is energized as a function of the mean electrode current so that the electrode is brought at a small distance from the work-piece, erosion due to sparking thus occurring at a high sparking frequency independent of the frequency of vibration. Thus, due to the decrease of the mean electrode current resulting from the increasing distance between electrode and work-piece on account of the erosion occurring, the electrode moves in a direction towards the work-piece, whereafter a new impact takes place by means of a subsequent voltage pulse.

The voltage pulses may be given, for example, with an interval of three seconds, so that an impact takes place approximately every three seconds. During this interval, spark erosion takes place at a high frequency of, for example, from 1,000 to 10,000 c./s., so that from 3,000 to 30,000 sparks are produced during 3 seconds as compared with, for example, 3,000 in the known device. The speed of processing thus increases, for example, from the five-fold to the fifty-fold.

In order that the invention may be readily carried into effect, one embodiment will now be described in detail, by way of example, with reference to the accompanying drawing, in which—

Figure 2:
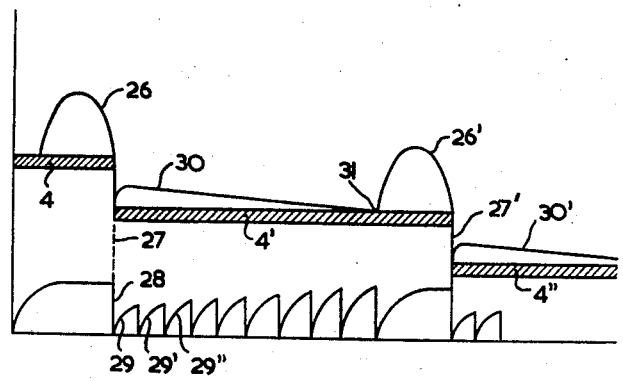

Fig. 1 shows a device, and
Fig. 2 shows diagrammatically the performance of the device.

In Fig. 1, the device 1 comprises a base plate 2 and a support 3 constituted by two columns on which a guide member 4 is arranged to be slidable with friction. An electrode holder 5' together with an electrode 5 and a cam 7 is connected by means of blade springs 6 to the guide member 4. At the rest position, the cam 7 may either bear on the member 4, or be maintained at a short distance from the member 4 by means of the springs 6. Beneath the electrode 5 is work-piece 8. All relays in the circuit arrangement are shown in the released (non-excited) condition.

The performance of the device is as follows, it being assumed that in the initial condition the guide member 4 is raised to an extent such that the electrode 5 is clear off the work-piece 8.

When a direct-voltage source is connected to terminals 9, capacitors 10 and 11 are charged via resistors 12 and 13. Furthermore, a relay 14 having a delay capacitor 15 is energized, resulting in an armature 16 being attracted and contacts 17 closed. Consequently, an electromagnetic device 18 for driving the electrode 5 is energized via contacts 19, 17 and a relay 20 having a delay capacitor 21. The electrode is thus pulled upwards against the action of the blade springs 6.

Subsequently, the armature of the retarding relay 20 is attracted, resulting in the contacts 19 being opened and contacts 22 closed and the electromagnetic device 18 being connected to a point 23 having a potential equal to that of the positive terminal 9. An armature 25 is thus released and hence the electrode, resulting in an impact between the cam 7 and the member 4. The latter is displaced downwards over a certain distance on the support 3 together with the electrode 5, the armature 25 and the device 18. When the electrode 5 has not yet reached the work-piece 8, the armature of relay 20 is de-energized after a short time and the contacts 19 are again closed, resulting in the cycle being repeated until the electrode 5 has approached the work-piece 8. It is to be noted that the contacts 17 always remain closed for the time being.

If, now, the distance between the electrode 5 and the work-piece 8 has become so small that capacitor 11 is discharged via electrode 5 and work-piece 8, a charging current starts to flow via resistor 12. This results in a voltage drop across the resistor 12 which is sufficient to keep relay 20 in the attracted condition, so that the contacts 22 remain closed and another impact is not brought about by the device 18. The voltage drop across the resistor 12 is now also set up across the device 18. As a result of the current traversing the device 18, which current is now much less than in the case of the above-mentioned pulses, the electrode 5 is pulled upwards over a small distance, so that the distance between cam 7 and guide member 4 increases and a certain distance occurs between electrode and work-piece. The capacitor 11, which in the meantime has partly been recharged, is discharged across this gap and then charged via resistor 13, etc., so that sparks are produced at a high frequency. The work-piece is thus eroded and the air-gap becomes larger. This results in the capacitor being charged to an ever-increasing voltage before sparking occurs. However, as a result thereof, the mean electrode current traversing resistor 12 slightly decreases. The capacitor 10, which has a high capacitance with respect to capacitor 11 (for example 500 µf. with respect to 1 µf.), serves to smooth the voltage across resistor 12. The voltage drop across resistor 12 decreases, so that the current traversing device 18 decreases and the armature together with the electrode 5 slowly drops. Thus the air-gap between the electrode and the work-piece is maintained substantially constant and increases only very slowly. After, for example, 3 seconds, the electrode has dropped to an extent such that it cannot drop further due to the counteraction of the blade springs 6 or due to the cam impacting with the member 4. As a result of the progressing erosion due to sparking, the said air-gap becomes larger and larger, resulting in a decrease of the mean electrode current through resistor 12. Decreased mean electrode current through resistor 12 causes the armature of relay 20 to become deenergized so that the contacts 22 are opened and the contacts 19 are closed. Consequently, the device 18 is again energized to the full extent, electrode 5 is pulled up, relay 20 is energized, the contacts 19 are opened and the contacts 22 are closed. Thus an impact again occurs, resulting in the member 4 dropping and the cycle being repeated.

This process is graphically illustrated in Fig. 2. The axis of abscissa indicates the time duration and the upper ordinates indicate the distances covered by the member 4 towards the work-piece upon each impact and in the lower part of the figure the ordinates indicate the voltages of capacitor 11.

The curves 26 show the pulling up and dropping of the electrode 5 with respect to the member 4 upon each voltage pulse at the device 18. At the moment 27, the cam 7 impacts upon the member 4, so that the latter reaches the position 4'. The capacitor 11 is discharged at this moment, as indicated by 28, so that a charging current starts to flow. Due to the charging current the voltage across capacitor 11 increases as indicated by 29 and, due to the mean charging current, the electrode 5 rises and comes clear off the member 4', as indicated by line 30. The capacitor 11 is charged and discharged a large number of times, as represented by the curves 29', 29'', etc. Due to a decrease in the current through resistor 12, the electrode slowly moves down according to line 30 to the lowest point 31. Due to a decrease in the mean electrode current, relay 20 at last is de-energized and a new voltage pulse is supplied to the device 18, resulting in a new impact at the moment 27', etc. The duration between 27 and 27' may be, for example, 3 seconds (dependent upon the machine, the material of the work-piece, the cross-section of the electrode, etc.), whilst the number of sparks during this trajectory is, for example, 20,000.

It is possible that, after an impact, the electrode keeps clamping in the hole of the work-piece, resulting in capacitor 11 being permanently short-circuited. The relay 20 thus remains in the attracted condition due to the mean electrode current now being higher.

Due to this short-circuit, the voltage at the retarding relay 14, 15 disappears and the contacts 17 are opened and the contacts 32 closed. A strong current thus temporarily flows from the negative terminal 9 through the lead 33, the non-charged capacitor 34, contacts 32, the device 18 and relay 20 to the positive terminal 9. As a result thereof, the electrode 5 is pulled loose from the work-piece. Due to the charging of capacitor 34, the current gradually decreases so that, with correct proportioning of the electrical values, the electrode after rapidly reaching its highest position again slowly approaches the work-piece. Thus there is no possibility of renewed short-circuiting by clamping and an impact between cam 7 and member 4, which would now be very undesirable, is also prevented. In the meantime, the retarding relay 14 was again energized, so that the contacts 17 were closed. The initial condition is thus restored and capacitor 34 is discharged through resistor 35.

Instead of using a single relay 20, 21, it is alternatively possible to use two relays having a plurality of contacts, which permits of easier adjustment of the delay times, the relay 20, 21 then being replaced by contacts.

What is claimed is:

1. A device for processing a metal workpiece comprising a support, a guide member movably mounted on said support, a holder suspended on said guide member, an electrode mounted in said holder, means mounted on said holder for moving said guide member toward said workpiece when said electrode is moved toward the said workpiece, first supply means for supplying electrical energy to said electrode and said workpiece in a manner whereby an electrical discharge occurs between the said electrode and the said workpiece when the said electrode and the said workpiece are in operative proximity to each other, said discharge causing erosion of the said workpiece at the area of proximity of the said electrode, means for deriving a control voltage proportional to the mean current flowing through said electrode, the mean electrode current having a magnitude which is a maximum upon electrical discharge between said electrode and said workpiece and which decreases as the distance between the said electrode and the said workpiece increases, electromagnetic actuating means for periodically moving said electrode toward said workpiece, second supply means for supplying electrical energy to said actuating means to energize the said actuating means thereby to cause said electrode to move toward said workpiece, said second supply means having a recurrence frequency which is low relative to that of said first supply means, and means dependent upon said control voltage for energizing said actuating means periodically in a manner whereby said electrode is moved toward said workpiece upon a decrease in magnitude of the said mean electrode current resulting from an increase in distance between the said electrode and the said workpiece caused by erosion of the said workpiece in the area of the said electrode.

2. A device for processing a metal workpiece comprising a support, a guide member movably mounted on said support, a holder suspended on said guide member, an electrode mounted in said holder, means mounted on said holder for moving said guide member toward said workpiece when said electrode is moved toward the said workpiece, first supply means for supplying electrical energy to said electrode and said workpiece in a manner whereby an electrical discharge occurs between the said electrode and the said workpiece when the said electrode and the said workpiece are in operative proximity to each other, said discharge causing erosion of the said workpiece at the area of proximity of the said electrode, means for deriving a control voltage proportional to the mean current flowing through said electrode, the mean electrode current having a magnitude which is a maximum upon electrical discharge between said electrode and said workpiece and which decreases as the distance between the said electrode and the said workpiece increases, electromagnetic actuating means for periodically moving said electrode toward said workpiece, second supply means for supplying electrical energy to said actuating means to energize the said actuating means thereby to cause said electrode to move toward said workpiece, said second supply means having a recurrence frequency which is low relative to that of said first supply means, and means dependent upon said control voltage for energizing said actuating means periodically in a manner whereby said electrode is moved toward said workpiece upon a decrease in magnitude of the said mean electrode current resulting from an increase in distance between the said electrode and the said workpiece caused by erosion of the said workpiece in the area of the said electrode, said last-mentioned means comprising a relay having an excitation winding, means dependent upon said control voltage for energizing said excitation winding, means interposing said relay between said second supply means and said actuating means in a manner whereby the recurrence frequency of the said second supply means is determined by the condition of energization of the said relay.

3. A device for processing a metal workpiece comprising a support, a guide member movably mounted on said support, a holder suspended on said guide member, an electrode mounted in said holder, means mounted on said holder for moving said guide member toward said workpiece when said electrode is moved toward the said workpiece, first supply means for supplying electrical energy to said electrode and said workpiece in a manner whereby an electrical discharge occurs between the said electrode and the said workpiece when the said electrode and the said workpiece are in operative proximity to each other, said first supply means comprising a capacitor connected between said electrode and said workpiece in a manner whereby said capacitor is discharged periodically through the said electrode and the said workpiece, a first resistor and means for supplying a direct voltage to said capacitor through said first resistor thereby to charge the said capacitor, said electrical discharge causing erosion of the said workpiece at the area of proximity of the said electrode, means for deriving a control voltage proportional to the mean current flowing through said electrode comprising a second resistor connected between said direct voltage supplying means and said first resistor, said control voltage being derived from said second resistor, the mean electrode current having a magnitude which is a maximum upon electrical discharge between said electrode and said workpiece and which decreases as the distance between the said electrode and the said workpiece increases, electromagnetic actuating means for periodically moving said electrode toward said workpiece, second supply means for supplying electrical energy to said actuating means to energize the said actuating means thereby to cause said electrode to move toward said workpiece, said second supply means having a recurrence frequency which is low relative to that of said first supply means, and means dependent upon said control voltage for energizing said actuating means periodically in a manner whereby said electrode is moved toward said workpiece upon a decrease in magnitude of the said mean electrode current resulting from an increase in distance between the said electrode and the said workpiece caused by erosion of the said workpiece in the area of the said electrode.

4. A device for processing a metal workpiece comprising a support, a guide member movably mounted on said support, a holder suspended on said guide member, an electrode mounted in said holder, means mounted on said holder for moving said guide member toward said workpiece when said electrode is moved toward the said workpiece, first supply means for supplying electrical energy to said electrode and said workpiece in a manner whereby an electrical discharge occurs between the said electrode and the said workpiece when the said electrode and the said workpiece are in operative proximity to each other, said discharge causing erosion of the said workpiece at the area of proximity of the said electrode, means for deriving a control voltage proportional to the mean current flowing through said electrode, the mean electrode current having a magnitude which is a maximum upon electrical discharge between said electrode and said workpiece and which decreases as the distance between the said electrode and the said workpiece increases, electromagnetic actuating means for periodically moving said electrode toward said workpiece, second supply means for supplying electrical energy to said actuating means to energize the said actuating means thereby to cause said electrode to move toward said workpiece, said second supply means having a recurrence frequency which is low relative to that of said first supply means, and means dependent upon said control voltage for energizing said actuating means periodically in a manner whereby said electrode is moved toward said workpiece upon a decrease in magnitude of the said mean electrode current resulting from an increase in distance between the said electrode and the said workpiece caused by erosion of the said workpiece in the area of the said electrode, said last-mentioned means comprising a relay having an excitation winding and first and second pairs of contacts adapted to be closed and opened by said excitation winding in a manner whereby said first pair of contacts is closed and said second pair of contacts is opened when said excitation winding is in energized condition and the said first pair of contacts is opened and the said second pair of contacts is closed when the said excitation winding is deenergized, means connecting said excitation winding in parallel with said electrode and said workpiece, means interposing said first pair of contacts between said second supply means and said actuating means in a manner whereby the said actuating means is energized as a function of said mean electrode current, a capacitor connected to said second supply means, and means interposing said second pair of contacts between said last-mentioned capacitor and said actuating means in a manner whereby the said actuating means is connected in series with the said last-mentioned capacitor across said second supply means as a function of said mean electrode current.

5. A device for processing a metal workpiece comprising a support, a guide member slidably mounted with friction on said support, a holder resiliently suspended on said guide member, an electrode mounted in said holder, means mounted on said holder for moving said guide member toward said workpiece when said electrode is moved toward the said workpiece, a source of direct voltage, first supply means for energizing said electrode and said workpiece from said direct voltage source in a manner whereby an electrical discharge occurs between the said electrode and the said workpiece when the said electrode and the said workpiece are in operative proximity to each other, said discharge causing erosion of the said workpiece at the area of proximity of the said electrode, means for deriving a control voltage proportional to the mean current flowing through said electrode, the mean electrode current having a magnitude which is a maximum upon electrical discharge between said electrode and said workpiece and which decreases as the distance between the said electrode and the said workpiece increases, electromagnetic actuating means for periodically moving said electrode toward said workpiece, second supply means for energizing said actuating means with voltage pulses derived from said direct voltage source thereby to cause said electrode to move toward said workpiece, said pulses having a recurrence frequency which is low relative to that of said first supply means, and means dependent upon said control voltage for energizing said actuating means after each of said pulses in a manner whereby said electrode is moved toward said workpiece upon a decrease in magnitude of the said mean electrode current resulting from an increase in distance between the said electrode and the said workpiece caused by erosion of the said workpiece in the area of the said electrode.

6. A device for processing a metal workpiece comprising a support, a guide member slidably mounted with friction on said support, a holder resiliently suspended on said guide member, an electrode mounted in said holder, means mounted on said holder for moving said guide member toward said workpiece when said electrode is moved toward the said workpiece, a source of direct voltage, first supply means for energizing said electrode and said workpiece from said direct voltage source in a manner whereby an electrical discharge occurs between the said electrode and the said workpiece when the said electrode and the said workpiece are in operative proximity to each other, said discharge causing erosion of the said workpiece at the area of proximity of the said electrode, means for deriving a control voltage proportional to the mean current flowing through said electrode, the mean electrode current having a magnitude which is a maximum upon electrical discharge between said electrode and said workpiece and which decreases as the distance between the said electrode and the said workpiece increases, electromagnetic actuating means for periodically moving said electrode toward said workpiece, second supply means for energizing said actuating means with voltage pulses derived from said direct voltage source thereby to cause said electrode to move toward said workpiece, said pulses having a recurrence frequency which is low relative to that of said first supply means, and means dependent upon said control voltage for energizing said actuating means after each of said pulses in a manner whereby said electrode is moved toward said workpiece upon a decrease in magnitude of the said mean electrode current resulting from an increase in distance between the said electrode and the said workpiece caused by erosion of the said workpiece in the area of the said electrode, said last-mentioned means comprising a relay having an excitation winding, means dependent upon said control voltage for energizing said excitation winding, means interposing said relay between said direct voltage source and said actuating means in a manner whereby the recurrence freqeuncy of said pulses is determined by the condition of energization of said relay.

7. A device for processing a metal workpiece comprising a support, a guide member slidably mounted with friction on said support, a holder resiliently suspended on said guide member, an electrode mounted in said holder, means mounted on said holder for moving said guide member toward said workpiece when said electrode is moved toward the said workpiece, a source of direct voltage, first supply means for energizing said electrode and said workpiece from said direct voltage source in a manner whereby an electrical discharge occurs between the said electrode and the said workpiece when the said electrode and the said workpiece are in operative proximity to each other, said first supply means comprising a capacitor connected between said electrode and said workpiece in a manner whereby said capacitor is discharged periodically through the said electrode and the said workpiece, a first resistor and means connecting said capacitor to said direct voltage source through said first resistor thereby to charge the said capacitor, said electrical discharge causing erosion of the said workpiece at the area of proximity of the said electrode, means for deriving a control voltage proportional to the mean current flowing through said electrode comprising a second resistor connected between said direct voltage source and said first resistor, said control voltage being derived from said second resistor, the mean electrode current having a magnitude which is a maximum upon electrical discharge between said electrode and said workpiece and which decreases as the distance between the said electrode and the said workpiece increases, electromagnetic actuating means for periodically moving said electrode toward said workpiece, second supply means for energizing said actuating means with voltage pulses derived from said direct voltage source thereby to cause said electrode to move toward said workpiece, said pulses having a recurrence frequency which is low relative to that of said first supply means, and means dependent upon said control voltage for energizing said actuating means after each of said pulses in a manner whereby said electrode is moved toward said workpiece upon a decrease in magnitude of the said mean electrode current resulting from an increase in distance between the said electrode and the said workpiece caused by erosion of the said workpiece in the area of the said electrode.

8. A device for processing a metal workpiece comprising a support, a guide member slidably mounted with friction on said support, a holder resiliently suspended on said guide member, an electrode mounted in said holder, means mounted on said holder for moving said guide member toward said workpiece when said electrode is moved toward the said workpiece, a source of direct voltage, first supply means for energizing said electrode and said workpiece from said direct voltage source in a manner whereby an electrical discharge occurs between the said electrode and the said workpiece when the said electrode and the said workpiece are in operative proximity to each other, said discharge causing erosion of the said workpiece at the area of proximity of the said electrode, means for deriving a control voltage proportional to the mean current flowing through said electrode, the mean electrode current having a magnitude which is a maximum upon electrical discharge between said electrode and said workpiece and which decreases as the distance between the said electrode and the said workpiece increases, electromagnetic actuating means for periodically moving said electrode toward said workpiece, second supply means for energizing said actuating means with voltage pulses derived from said direct voltage source thereby to cause said electrode to move toward said workpiece, said pulses having a recurrence frequency which is low relative to that of said first supply means, and means dependent upon said control voltage for energizing said actuating means after each of said pulses in a manner whereby said electrode is moved toward said workpiece upon a decrease in magnitude of the said mean electrode current resulting from an increase in distance between the said electrode and the said workpiece caused by erosion of the said workpiece in the area of the said electrode, said last-mentioned means comprising a relay having an excitation winding and first and second pairs of contacts adapted to be closed and opened by said excitation winding in a manner whereby said first pair of contacts is closed and said second pair of contacts is opened when said excitation winding is in energized condition and the said first pair of contacts is opened and the said second pair of contacts is closed when the said excitation winding is deenergized, means connecting said excitation winding in parallel with said electrode and said workpiece, means interposing said first pair of contacts between said direct voltage source and said actuating means in a manner whereby the said actuating means is energized as a function of said mean electrode current, a capacitor connected to said direct voltage source, and means interposing said second pair of contacts between said last-mentioned capacitor and said actuating means in a manner whereby the said actuating means is connected in series with the said last-mentioned capacitor across said direct voltage source as a function of said mean electrode current.

9. A device for processing a metal workpiece comprising a support, a guide member slidably mounted with friction on said support, a holder resiliently suspended on said guide member, an electrode mounted in said holder, means mounted on said holder for moving said guide member toward said workpiece when said electrode is moved toward the said workpiece, a source of direct voltage, first supply means for energizing said electrode and said workpiece from said direct voltage source in a manner whereby an electrical discharge occurs between the said electrode and the said workpiece when the said electrode and the said workpiece are in operative proximity to each other, said first supply means comprising a capacitor connected between said electrode and said workpiece in a manner whereby said capacitor is discharged periodically through the said electrode and the said workpiece, a first resistor and means connecting said capacitor to said direct voltage source through said first resistor thereby to charge the said capacitor, said electrical discharge causing erosion of the said workpiece at the area of proximity of the said electrode, means for deriving a control voltage proportional to the mean current flowing through said electrode comprising a second resistor connected between said direct voltage source and said first resistor, said control voltage being derived from said second resistor, the mean electrode current having a magnitude which is a maximum upon electrical discharge between said electrode and said workpiece and which decreases as the distance between the said electrode and the said workpiece increases, electromagnetic actuating means for periodically moving said electrode toward said workpiece, second supply means for energizing said actuating means with voltage pulses derived from said direct voltage source thereby to cause said electrode to move toward said workpiece, said pulses having a recurrence frequency which is low relative to that of said first supply means, and means dependent upon said control voltage for energizing said actuating means after each of said pulses in a manner whereby said electrode is moved toward said workpiece upon a decrease in magnitude of the said mean electrode current resulting from an increase in distance between the said electrode and the said workpiece caused by erosion of the said workpiece in the area of the said electrode, said last-mentioned means comprising a relay having an excitation winding and first and second pairs of contacts adapted to be closed and opened by said excitation winding in a manner whereby said first pair of contacts is closed and said second pair of contacts is opened when said excitation winding is in energized condition and the said first pair of contacts is opened and the said second pair of contacts is closed when the said excitation winding is deenergized, means connecting said excitation winding in parallel with said electrode and said workpiece, means interposing said first pair of contacts between said direct voltage source and said actuating means in a manner whereby the said actuating means is energized as a function of said mean electrode current, a second capacitor connected to said direct voltage source, and means interposing said second pair of contacts between said second capacitor and said actuating means in a manner whereby the said actuating means is connected in series with the said second capacitor across said direct voltage source as a function of said mean electrode current.

10. A device for processing a metal workpiece comprising a support, a guide member slidably mounted with friction on said support, a holder resiliently suspended on said guide member, an electrode mounted in said holder, means mounted on said holder for moving said guide member toward said workpiece when said electrode is moved toward the said workpiece, a source of direct voltage, first supply means for energizing said electrode and said workpiece from said direct voltage source in a manner whereby an electrical discharge occurs between the said electrode and the said workpiece when the said electrode and the said workpiece are in operative proximity to each other, said first supply means comprising a capacitor connected between said electrode and said workpiece in a manner whereby said capacitor is discharged periodically through the said electrode and the said workpiece, a first resistor and means connecting said capacitor to said direct voltage source through said first resistor thereby to charge the said capacitor, said electrical discharge causing erosion of the said workpiece at the area of proximity of the said electrode, means for deriving a control voltage proportional to the mean current flowing through said electrode comprising a second resistor connected between said direct voltage source and said first resistor, said control voltage being derived from said second resistor, the mean electrode current having a magnitude which is a maximum upon electrical discharge between said electrode and said workpiece and which decreases as the distance between the said electrode and the said workpiece increases, electromagnetic actuating means for periodically moving said electrode toward said workpiece, second supply means for energizing said actuating means with voltage pulses derived from said direct voltage source thereby to cause said electrode to move toward said workpiece, said pulses having a recurrence frequency which is low relative to that of said first supply means, and means dependent upon said control voltage for energizing said actuating means after each of said pulses in a manner whereby said electrode is moved toward said workpiece upon a decrease in magnitude of the said mean electrode current resulting from an increase in distance between the said electrode and the said workpiece caused by erosion of the said workpiece in the area of the said electrode, said last-mentioned means comprising a relay having an excitation winding and first and second pairs of contacts adapted to be closed and opened by said excitation winding in a manner whereby said first pair of contacts is closed and said second pair of contacts is opened when said excitation winding is in energized condition and the said first pair of contacts is opened and the said second pair of contacts is closed when the said excitation winding is deenergized, means connecting said excitation winding in parallel with said electrode and said workpiece, means interposing said first pair of contacts between said direct voltage source and said actuating means in a manner whereby the said actuating means is energized as a function of said mean electrode current, a second capacitor connected to said direct voltage source, and means interposing said second pair of contacts between said second capacitor and said actuating means in a manner whereby the said actuating means is connected in series with the said second capacitor across said direct voltage source as a function of said mean electrode current, and means for preventing clamping between said electrode and said workpiece comprising a second relay having a second excitation winding and first and second pairs of contacts adapted to be closed and opened by said second excitation winding in a manner whereby said first pair of contacts is closed and said second pair of contacts is opened when said second excitation winding is in deenergized condition and the said first pair of contacts is opened and the said second pair of contacts is closed when the said second excitation winding is energized, means connecting said second excitation winding in parallel with said electrode and said workpiece, means interposing said first and second pairs of contacts between said direct voltage source and said actuating means in a manner whereby the said actuating means is deenergized when said electrical discharge occurs and energized after the said electrical discharge ceases.

References Cited in the file of this patent

UNITED STATES PATENTS

| | | |
|---|---|---|
| 2,766,364 | Higgins et al. | Oct. 9, 1956 |
| 2,796,509 | Blake | June 18, 1957 |